United States Patent [19]

Meltzer

[11] 4,368,513

[45] Jan. 11, 1983

[54] PARTIAL ROLL MODE TRANSFER FOR CYCLIC BULK MEMORY

[75] Inventor: David Meltzer, Wappingers Falls, N.Y.

[73] Assignee: International Business Machines Corp., Armonk, N.Y.

[21] Appl. No.: 133,234

[22] Filed: Mar. 24, 1980

[51] Int. Cl.³ .............................................. G06F 7/22
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 2,840,304 | 6/1958 | Williams | 364/200 |
| 2,913,706 | 11/1959 | Thorensen et al. | 364/900 |
| 2,925,587 | 2/1960 | Thorensen et al. | 360/39 |
| 3,303,476 | 2/1967 | Moyer | 364/200 |
| 3,336,582 | 8/1967 | Beausoleil et al. | 364/200 |
| 3,341,817 | 9/1967 | Smeltzer | 364/200 |
| 3,400,371 | 9/1968 | Amdahl et al. | 364/200 |
| 3,411,143 | 11/1968 | Beausoleil | 364/200 |
| 3,488,633 | 1/1970 | King et al. | 364/200 |
| 3,654,622 | 4/1972 | Beausoleil | 364/900 |
| 3,735,361 | 5/1973 | Tasso | 364/200 |
| 4,028,665 | 6/1977 | Tasso | 364/900 |
| 4,232,365 | 11/1980 | Englund | 364/200 |

OTHER PUBLICATIONS

Japanese Published Unexamined Patent Application 52-64837, T. Yamamoto, Published May 28, 1977.
IBM Technical Disclosure Bulletin, Transparent Roll Mode for Rotating Device, Stevenson, D. A., vol. 13, No. 1, 6/70, pp. 93-95.
IBM Customer Engineering Manual for the 7612 Disk Synchronizer, Form R23-9710, 1961.
IBM System 1370 Principles of Operation, Form GA22-7000-4, 1970.

*Primary Examiner*—Mark E. Nusbaum
*Assistant Examiner*—Michael R. Fleming
*Attorney, Agent, or Firm*—R. Lieber

[57] ABSTRACT

Latency of a cyclic bulk storage device attached to a CPU and a main storage through standard channel facilities is reduced without modification of the channel and CPU hardwares. The storage device is divided into a plurality of randomly accessible pages each having parallel cyclic tracks. Each page is subdivided into two sequentially and cyclically accessible Sectors 0 and Sector 1. Parallel bits on different tracks form bytes. Data are transferred byte by byte between a selected page of the device and a specified one-page data area in the main storage. A channel program is constructed using three commands (CCWs); a Seek Page command followed by two different Read or Write commands. At the end of the Seek Page operation, a control unit determines which of Sector 0 or 1 is more immediately accessible. If it is Sector 0 a branching control signal given to the channel causes the channel to chain to the second CCW, but if it is Sector 1, a different control signal given to the channel causes it to skip over the second CCW and chain to the third CCW. When chained to the second CCW, the channel executes the transfer of one page of data in normal sequence, i.e. Sector 0 first and Sector 1 next. When chained to the third CCW, the channel executes the data transfer in reverse sequence, i.e. Sector 1 first and Sector 0 next. Such sector transfers are selectively controlled by indirect data address words (IDAWs).

17 Claims, 5 Drawing Figures

PARTIAL ROLL MODE TRANSFER FOR CYCLIC BULK MEMORY

BACKGROUND OF THE INVENTION

1. Field of the Invention

The present invention relates to a partial roll mode transfer between a random access main storage and a cyclic bulk memory, and more particularly to a latency reduction scheme for cylic bulk memory using existing standard channel facilities.

2. Statement of the Problem

Cyclic bulk storages such as disk files and drum files have been used as auxiliary storage devices of a data processing system. With the development of integrated circuit technology, it has recently been contemplated to use integrated circuit bulk memories such as CCD memories or magnetic bubble memories to take the place of conventional mechanical cyclic bulk storages. The CCD memories and magnetic bubble memories are called "electronic drum" files because of their functional resemblance to the classic drum file. Because of their cyclic nature such memories inherently present a delay between the start of an operation by a channel and the actual transfer of data. This delay, termed "latency", is due to the waiting time required for a starting address of the cyclic memory to come to a read/write port. In the worst case, the latency or waiting time amounts to a full circulation time of the drum file. This substantially degrades system performance. Techniques called "roll mode" transfer have been proposed to reduce the latency. When such cyclic memory files are coupled to a CPU main memory through a channel unit, however, the use of known or proposed roll mode transfer techniques requires addition to the channel of special functions which channels in existing systems such as IBM System/360 and IBM System/370 do not have.

3. Description of the Prior Art

IBM System/370 Principles of Operation, Form GA 22-7000-4, pages 185-242, describes the Input/Output operation of the IBM System/370. It explains, among other things, the functions of channel address words (CAW's), channel command words (CCW's), command chaining, the use of status modifier signals to control skipping functions in command chaining programs, channel indirect data addressing (CIDA), and the usage of indirect data address words (IDAW's).

U.S. Pat. No. 3,400,371 to G. M. Amdahl et al, issued Sept. 3, 1968 and assigned to the Assignee of the present application, shows a computer system designed for operating in accordance with a subset of the principles specified in the foregoing Principles of Operation publication, and exemplifying an embodiment of an IBM System/360 computing system. In the section of this patent entitled "Input/Output Operations" there are disclosed structures and operations of I/O channel facilities.

U.S. Pat. No. 3,400,372 to W. F. Beausoleil et al, issued Sept. 3, 1968 and assigned to the Assignee of the present application, shows a channel adapter which electronically connects a data channel of one CPU to a data channel of a second CPU.

U.S. Pat. No. 3,336,582 to W. F. Beausoleil et al, issued Aug. 15, 1967 and assigned to the Assignee of the present application, shows a communication system which connects I/O devices of differing data rates with a data processing system. Operation proceeds on an interlocked basis.

U.S. Pat. No. 3,488,633 to L. E. King et al, issued Jan. 6, 1970 and assigned to the Assignee of the present application, shows I/O channel apparatus for a data processing system. Logical circuitry is provided in the channel to provide for the assembly of bytes into words and to transfer the words to and from a storage in the data processing system. The data processing system may specify variable length fields which start and end on any byte position within a word.

U.S. Pat. No. 3,303,476 to J. T. Moyer et al, issued Feb. 7, 1967 and assigned to the Assignee of the present application, shows structure and functioning of I/O device control units which provide connection between I/O devices and an interface between the control unit and an I/O channel of a central processing system.

U.S. Pat. No. 3,411,143 to W. F. Beausoleil et al, issued Nov. 12, 1968 and assigned to the Assignee of the present invention shows a control apparatus for sequencing a series of I/O channel commands controlling the operation of a peripheral device of a data processing system. A series of operations at a peripheral device can be initiated by a CPU of the system which issues a start I/O instruction after which the CPU is free to carry on its own main program, the channel selecting its own command words from storage as required to carry out the sequence of peripheral operations. A signal from the peripheral device transmitted over an I/O interface is employed to select a new channel command word displaced in storage from the current command word by a predetermined number of storage locations thereby providing for branching on a condition determined by the peripheral device.

U.S. Pat. No. 2,840,304 to F. C. Williams, issued June 24, 1958 and assigned to National Research and Development Corp., shows the concept of "roll-mode" transfer between a drum storage and a main core storage utilizing a currently available drum position as the addressing control for main storage. One of the parallel recording tracks of the drum is utilized to record separate address indications representative of each of the word storage locations in the other tracks of the drum. These address indications are themselves related to appropriate address locations for the same words in the core storage. The signals obtained from such address track are used to control the setting of address selecting means of the core storage during transfer operations so that the address in the core storage which is active at any instant during a word transfer operation corresponds to the proper store location of that portion of any record track which is currently available for information transfer.

U.S. Pat. No. 2,925,587 to R. Thorensen et al, issued Feb. 16, 1960 and assigned to Secretary of Commerce, U.S.A. and U.S. Pat. No. 2,913,706 to R. Thorensen et al, issued Nov. 17, 1959, the latter patent being a division of the former patent, both deal with minimizing waiting time or access time in a magnetic drum memory system. Means are provided to transfer information in sizeable blocks from the magnetic drum memory to an electrostatic memory. The blocks of information are arranged on the drum to reduce "dead waiting time" for the drum, that is, the time taken for the drum to come to a specific position before transcribing can occur. The information comprising a block is stored sequentially around the circumference of the drum so that each block completely fills a respective band or channel on the drum. When a transfer to or from the drum memory is made, the entire channel is handled at one time and transfer of information starts immediately after the desired channel has been selected and continues for exactly one revolution of the drum.

IBM Customer Engineering Manual for the 7612 Disk Synchronizer, Form R23-9710, also discloses a roll-mode transfer technique to shorten access time in transferring complete tracks of information from a disk storage to a core storage. An entire track of information on the disk is transferred commencing with the beginning of any of eight separate sectors. Whereas "conventional" transfers would always start with the first data position of sector 0 and end with the last data position of sector 7, in roll mode the transfer may start at the beginning of any one of the eight sectors. The data word address in the transfer control word is modified to change the starting address of the core storage from the address assigned to word 0, sector 0 to the address allotted for word 0 of the sector in which the transfer actually starts. The position of the disk relative to the transducer is continuously indicated by a counter in a disk unit. Reading or writing begins at the start of the next sector-track to pass under the read or write heads, and continues for one full revolution (track) without changing track. The maximum access time is that required to reach the next sector-track, that is, one-eighth of one revolution time. When the disk reaches the end of sector 7, the address in the control word is altered to correspond to the beginning of sector 0. An orderly transfer of data is accomplished and causes the data to appear in the core storage in the same order as on the disk, starting at sector 0. After transfer, the data always appears in the correct and sequential locations of memory even though the transfer did not take place in the order specified by the original control word.

U.S. Pat. No. 3,341,817 to J. C. Smeltzer, issued Sept. 12, 1967 and assigned to the Bunker-Ramo Corp. handles data transfer between a cyclic memory, e.g., magnetic drum and a rapid random access memory, e.g. magnetic core memory. In this patent, an immediate transfer of information between the cyclic memory and the random access memory is effected by using the address of the information about to be read from the cyclic memory to define a location in the rapid access memory into which the information is written.

U.S. Pat. No. 3,654,622 to W. F. Beausoleil, issued Apr. 4, 1972 and assigned to the Assignee of the present application, shows a bulk storage made up of shift registers arranged in a three-dimensional memory matrix. Each shift register in the matrix has the capacity to store a plurality of bits, e.g. 256 bits. Each shift register can be shifted so that these bits are presented in a serial manner at the output of the shift register. Each shift register represents a bit position of a parallel word made up of a plurality of bits. Shift registers are arranged in columns and rows in a memory plane.

Japanese Published Unexamined Patent Application 52-64837 by T. Yamanoto, published May 28, 1977 and assigned to Nippon Telegraph and Telephone Public Corp., deals with information transfer between a serial memory, e.g. multiple parallel shift registers constructed out of CCD, BBD, or MOS transistors, and a rapid random access memory. It is directed to the partitioning of "tracks" in a serial access memory into "sector" divisions, and to initiation of read or write operations starting from the beginning of the most immediately available sector. According to the above patent application, the read or write operation can start at any available location address in a track. Means is provided to indicate a location address in the track which is currently available to a read/write port.

"Transparent Roll Mode for Rotating Device" by D. A. Stevenson, IBM TDB, Vol. 13, No. 1, June 1970, pages 93-95, discloses optional use of roll mode transfers normal accessing technqiues. The choice is based on the track length, the current position of a read or write head on the track, the offset of the beginning of the record on its first track, and the offset of the end of the record on its last track.

SUMMARY OF THE INVENTION

It is an object of the present invention to provide a latency reduction scheme for a cyclic bulk memory file.

It is another object of the present invention to provide a latency reduction scheme for a cyclic bulk memory file coupled to a CPU main storage through an existing standard I/O channel unit which does not require substantial modification of channel or CPU hardware.

It is another object of the present invention to provide a latency reduction scheme for a data processing system which includes a drum file coupled to a CPU main storage through an existing standard I/O channel unit.

In accordance with the present invention, the cyclic bulk storage is divided into a plurality of instantaneously accessible pages. Each page is further subdivided into two half-page sectors each of which contains a plurality of bytes which are sequentially and cyclically accessible on byte at a time. Data is transferred through an I/O channel between a selected page of the cyclic bulk storage and a specified one-page data area of the main storage. Data transfer begins either from the first or starting byte address of the more immediately accessible half-page sector of the selected page.

A channel program for each such transfer consists of three channel command words (CCW's) located at consecutive address locations in main storage; a Seek Page command, designating the page to be transferred, followed by two Read or Write commands. At the end of the Seek Page operation, a control unit associated with the bulk storage determines which of the two half-page sectors of the designated page is more immediately accessible and presents a related control signal to the channel. If it is the first sector, the channel chains to the second CCW immediately following the Seek Page CCW. If it is the second sector, the channel skips over the second CCW and chains to the third CCW. The control unit controls such skip-over by presenting a Status Modifier signal to the channel together with a Device End signal, both signals being conventional features of existing standard I/O channels.

When the second CCW is used, the read or write data transfer begins at the first byte of the first sector, proceeds through the last byte of the first sector, then continues with the first byte of the second sector and proceeds through the last byte of the second sector. Each byte is transferred to or from bulk storage, respectively from or to a corresponding byte location in a designated one-page data area of main storage. On the other hand, when the third CCW is used, the data transfer begins with the first byte of the second sector, proceeds through the last byte of that sector, then continues with the first byte of the first sector and proceeds through the last byte of the first sector. Again, each byte is transferred to or from a corresponding byte location in a designated one-page data area of main storage.

Channel indirect data addressing, which is a conventional feature of existing standard channel facilities, is used to accomplish the subject data transfer in the above-mentioned fashion. When the second CCW is used, that is, in the "normal" sector transfer sequence, two indirect data address words (IDAWs) which specify consecutive half-page main storage areas in normal sequence are pointed to by the second CCW. When the third CCW is used, that is, in the reversed sector transfer sequence, two IDAWs which specify consecutive half-page storage areas in reverse sequence are pointed to by the third CCW.

When the entire page has been transferred, the Device End signal is again generated with or without the Status Modifier signal, depending on whether the starting sector was the first sector or the second sector. This allows command sub-programs for multiple page transfers to be chained together in one channel program.

The foregoing and other objects, features and advantages of the invention may be more fully understood and appreciated by considering the following detailed description and claims in reference to the accompanying drawings.

DETAILED DESCRIPTION OF THE PREFERRED EMBODIMENT

Figure 1:
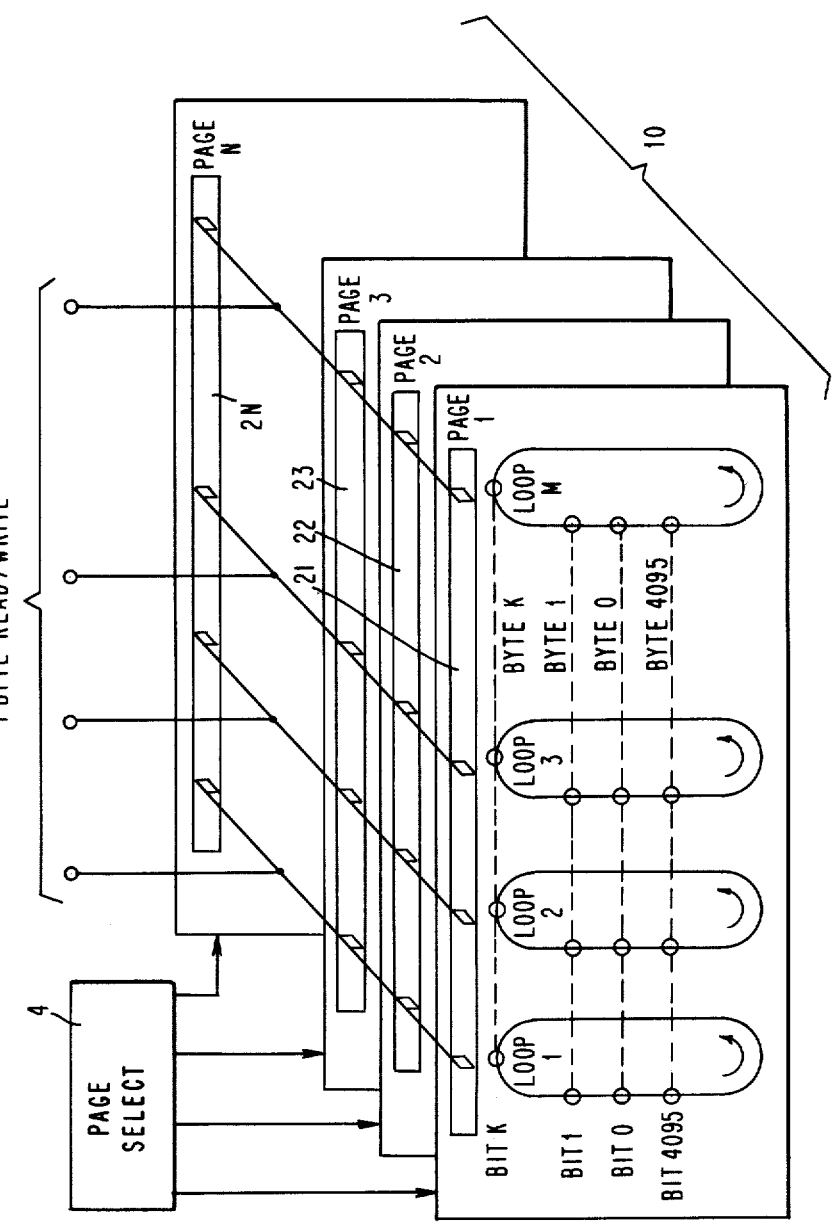
FIG. 1 is a schematic diagram of a "state of the art" electronic drum file consisting of multiple parallel shift registers, suitable for use in the present invention.

The present invention is specifically directed to a modified form of roll mode transfer and is useful for reducing the waiting time or latency required for obtaining access to a cyclic bulk storage file through existing standard I/O channel facilities; for instance, channels of the type used in IBM System/360 and System/370 processing systems. An important advantage of the present invention is that no substantial modification of the channel hardware is needed to accomplish the above objects. The present invention makes use of capabilities of existing standard channels in an effective and efficient way to accomplish transfers in a mode herein termed "partial roll mode".

More specifically, the latency reduction scheme of the present invention utilizes standard capabilities of existing channels, including command chaining, command sequence branching in response to status modifier signals, and channel indirect data addressing.

Before discussing the details of the present invention, it is advisable for a better understanding of the present invention to review relevant functions and capabilities of an existing standard I/O channel of the type used in IBM System/370 processing systems. The following discussion, considered relevant to an understanding of the present invention, is based upon matter contained in IBM System/370 Principles of Operation, Form GA22-7000-4, pages 185-242 (I/O operations).

In System/370 processing systems channel transfers of information to or from main storage, other than to or from a CPU or a direct control path, are referred to as input/output (I/O) operations. Each such transfer is conducted relative to an I/O device such as a CCD bulk storage. I/O devices perform I/O operations under control of control units which link to CPU and main storage by means of input/output channels. The input/output channel accepts control information from the CPU in a command word format determined by a program and changes it into a sequence of signals acceptable to the control unit. The control unit provides logical capabilities necessary to operate and control the I/O device, and adapts the characteristics of each I/O device to the standard form of control provided by the channel.

Such I/O operations are initiated by START I/O instructions, and controlled by channel command words (CCWs) and orders. Instructions are decoded by the CPU and are part of a CPU program. CCWs are decoded by channels and executed by channels in association with control units and I/O devices. CCWs initiate I/O operations such as searching, reading and writing. Instructions and CCWs are fetched from main storage (respectively by CPUs and channels). Functions peculiar to I/O devices are specified by orders designated in CCW's. Orders are decoded and executed by the I/O devices.

The CPU program initiates I/O operations with an instruction START I/O (or START I/O FAST RELEASE, hereinafter simply referred to as START I/O). This instruction identifies the channel and I/O device and causes the channel to fetch a channel address word (CAW) from a fixed location in main storage. The CAW consists of 32 bits; bits 0-3 are a protection key and bits 8-31 designate the location in main storage from which the channel subsequently fetches the first CCW for controlling the operation. The CCW consists of 64 bits; bits 0-7 specify the command operation to be executed, bits 8-31 (data address field) specify an initial 8-bit byte location in a data storage area in main storage, bit 32, when one, specifies data chaining (CD), bit 33, when one, and when the flag bit 32 is zero, specifies command chaining (CC), bit 37, when one, specifies indirect data addressing (IDA), and bits 48-63 (count field) specify the number of 8-bit byte locations in the storage area bounded by the address defined by bits 8-31.

The main storage area associated with a data transfer I/O operation is defined by one or more CCWs. A CCW defines an area by specifying the first 8-bit byte to be transferred (bits 8-31) and the number of consecutive 8-bit byte storage locations contained in the area (bits 48-63). In normal write (output) or read (input) data transfer operations, storage locations are used in ascending order of addresses. As information is transferred to or from main storage, the address from the address field (bits 8-31) is incremented, and the count from the count field (bits 48-63) is decremented. When the count reaches zero, the storage area defined by the CCW is exhausted.

During an output transfer operation, the channel may fetch data from main storage before the I/O device requests the data. Any number of bytes specified by the current CCW may be prefetched and buffered. When data chaining during an output operation, the channel may fetch the next CCW at any time during the execution of the current CCW.

When the channel has performed the transfer of information specified by a CCW, it can continue the activity initiated by START I/O by chaining to (i.e. fetching) a new CCW. Such command chaining usually takes place in a predetermined sequence between CCWs located in successive doubleword locations in storage; that is, the address of the new CCW is obtained by adding eight to the address of the current CCW.

During command chaining, the new CCW fetched by the channel specifies a new I/O operation. The channel fetches the new CCW and initiates the new operation upon receiving a Device-End (DE) signal during its current operation.

An exception to the sequential chaining of CCWs occurs when the I/O device presents a status modifier (SM) condition in conjunction with the Device-End signal. When command chaining is specified and no unusual conditions have been detected, the receipt of an SM signal in conjunction with a DE signal causes the channel to fetch and chain to the CCW whose main storage address is 16 higher than that of the current CCW (instead of 8 higher).

Channel indirect data addressing (CIDA) enables the channel to translate data addresses for I/O operations. For instance it enables a channel to use a single channel command word to control a transfer of a block of data spanning non-contiguous pages in real main storage. Channel indirect data addressing is specified by flat bit 37 in the CCW which, when one, indicates that the data address in the CCW (bits 8-31) is not used to directly address main storage. Instead, this address defines the location of a list of words, called indirect data address words (IDAWs), each of which designates a data area within a block of 2,048 contiguous byte locations in main storage.

When bit 37 in a CCW is one, bits 8-31 of the same CCW specify the location of the first IDAW to be used for the data transfer of that command. Additional IDAWs, if needed for completing the data transfer for the CCW, are in successive locations in storage. The number of IDAWs required for a CCW is determined by the count field (bits 48-63) of the CCW and by the data address (bits 8-31) in the initial IDAW. When, for example, the CCW count field specifies 4,000 bytes and the first IDAW specifies a location in the middle of a 2,048-byte block, three IDAWs are required. Each IDAW is used for the transfer of up to 2,048 data bytes. The IDAW specifed by a CCW can designate any location. For read, write, control and sense commands, data is transferred to or from successively higher storage locations until a 2,048-byte block boundary is reached. Control of the data transfer is then passed to the next IDAW. Depending on the command the second and any subsequent IDAWs must specify the first or last byte of a 2,048-byte block. For read, write and sense commands, these IDAWs will have zeros in bit positions 21-31. The channel may prefetch any of the IDAWs pertaining to the current CCW. An IDAW takes control of the data transfer when the last byte has been transferred for the previous IDAW of the associated CCW.

When the operation or sequence of operations initiated by START I/O is ended, the channel and the device generate status conditions which, together with an address and a count indicating the extent of the operation sequence, are presented to the program in the form of a channel status word (CSW). The CSW consists of 64 bits, of which bits 32-47 identify the conditions in the device and the channel that caused the storing of the CSW.

Bit 36 of the CSW is a channel end (CE) bit. The channel end is generated in association with the completion of a portion of an I/O operation involving transfer of data or control information between the I/O device and the channel. It indicates that the sub-channel has become available for use for another operation. Each I/O operation causes a channel end condition to be generated, and there is only one channel end for an operation.

Bit 37 of the CSW is the device end (DE) bit. The device end is associated with the completion of an I/O operation at the device. The condition normally indicates that the I/O device has become available for use for another operation. Each I/O operation causes a device end condition, and there is only one device end to an operation. When command chaining is specified the device end signal, when not associated with any unusual conditions, causes the channel to retrieve a new CCW and initiate a new I/O operation.

Bit 33 is a status modifier (SM) bit which is generated by the device when the normal sequence of commands must be modified. Concurrence of the status modifier (SM) and device end (DE) indicates to the channel that its normal sequence of command retrieval must be modified. If command chaining is specified in the current CCW and no unusual conditions have been detected, concurrence of status modifier and device end causes the channel to fetch and chain to the CCW whose main-storage address is 16 higher than that of the current CCW.

Having described the typical functions and capabilities of a standard channel, as exemplified by an IBM System/370 channel, the present invention will now be explained in detail.

In a conceptual schematic form FIG. 1 shows a presently conventional electronic drum file 10, e.g. a CCD memory file, which may be used in the present invention. The file 10 consists of N chips for storage of up to N 4,096-byte pages, termed Page 1 to Page N, each chip having M shift register loops (Loop 1 to Loop M) and each loop having 4,096 bit storage positions (Bit 0 to Bit 4,095). Considering Page 1 specifically, Bit 0 in the associated Loops 1 to M constitute an M-bit Byte referred to as Byte 0, Bits 1 in the associated Loops 1 to M constitute an M-bit Byte 1 and so on. Thus, 4,096 (or 4K) bytes (Bytes 0-4,095) are contained in each of the Pages 1-N. For each page there is provided an associated set of read/write ports 21, 22, 23 ... or 2N which permit parallel reading or writing of an M-bit byte for that page. The shift register loops on the pages of the file are rotated synchronously, in the direction shown by arrows, both with respect to loops within a page and with respect to loops in different pages so that all bits constituting Bytes K in Pages 1-N appear at read/write ports 21, 22, 23, ... and 2N at the same time.

A page selection means 4 is provided to select a page to or from which data is to be transferred. At any time only one read/write port, 21, 22, 23, ... or 2N, associated with one selected page is rendered active so that only the data bytes on the selected page are transferred. If roll mode transfer were not used, each such transfer would have to start at Byte 0 in the selected page. Thus if Byte 1 happened to be at the read/write port a signal to start when a read/write transfer was received, the device could not start the data transfer until Byte 0 reached the read/write port after a long waiting time corresponding to a full page revolution period.

Figure 2:
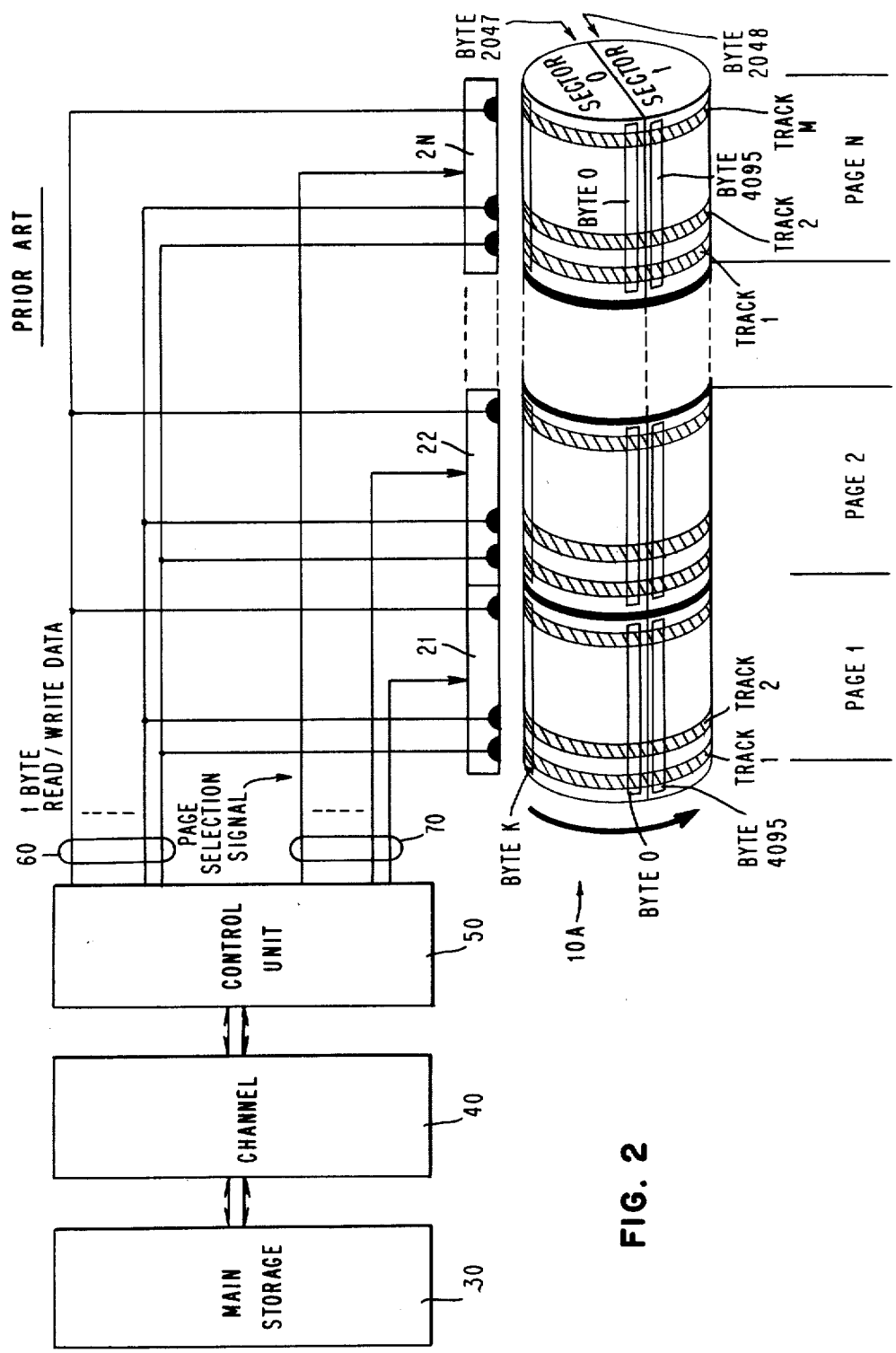
FIG. 2 shows a more conceptual view of the electronic drum file of FIG. 1 and its data path linkage to a CPU main storage.

In a more conceptual schematic form FIG. 2 shows a cyclic access drum memory file in the environment of use in accordance with the present invention. In FIG. 2, the memory file is schematically shown as a drum file 10A. The shift register loops shown in FIG. 1 are now shown as tracks on the drum and the drum is axially sectioned to define Pages 1-N. Again, Bits 0 to Tracks 1-M of each page constitute Byte 0 of the respective page, and in general Bits K on tracks 1-M constitute Byte K of the respective page. The drum file 10A is connected to a CPU main storage 30 through a channel 40, a control unit 50, data lines 60, not-shown selection means and one of the n sets of read/write ports 21-2N. An activated one of the page selection signal control lines 70 controls the not-shown selection means to select the ports associated with one of the Pages 1-N for a data transfer.

According to the present invention, each of the pages of the drum file 10A is divided into two halfpage sectors, Sector 0 containing Bytes 0-2,047 and Sector 1 containing Bytes 2,048-4,095. Means are provided in the control unit 50 to keep track of the byte addresses which are currently available at the read/write ports 21-2N. This may be easily accomplished by providing a counter which is incremented in synchronism with the rotation of the drum 10. According to the present invention, each read or write operation for transferring a page relative to the drum file 10A is initiated by the channel using a set of three contiguously stored channel command words (CCWs) arranged as follows.

CCW 1—Seek Page
CCW 2—Read or Write
CCW 3—Read or Write

A conventional read or write operation would require only two CCWs; a Seek Page command chained to a Read or a Write command. The Seek Page command would be used to indicate the address of the page on drum file 10A which is to be read or written, and the Read or Write command would be used to control the transfers beginning always at byte 0 of the specified page. Accordingly in the conventional mode of operation channel 40 and control unit 50 would be required to wait until Byte 0 on the required tracks reached the selected group of read/write ports 21-2N.

In accordance with the present invention, the channel program of three CCWs shown above can be used to shorten the waiting time by permitting the transfer operation to start at either one of two half-page (sector) boundaries within a page. Each of the two Read or Write commands (CCW 2 and CCW 3) can control the transfer of a full 4,096-byte page but only one is executed depending upon the sector boundary which is most immediately accessible.

Figure 3:
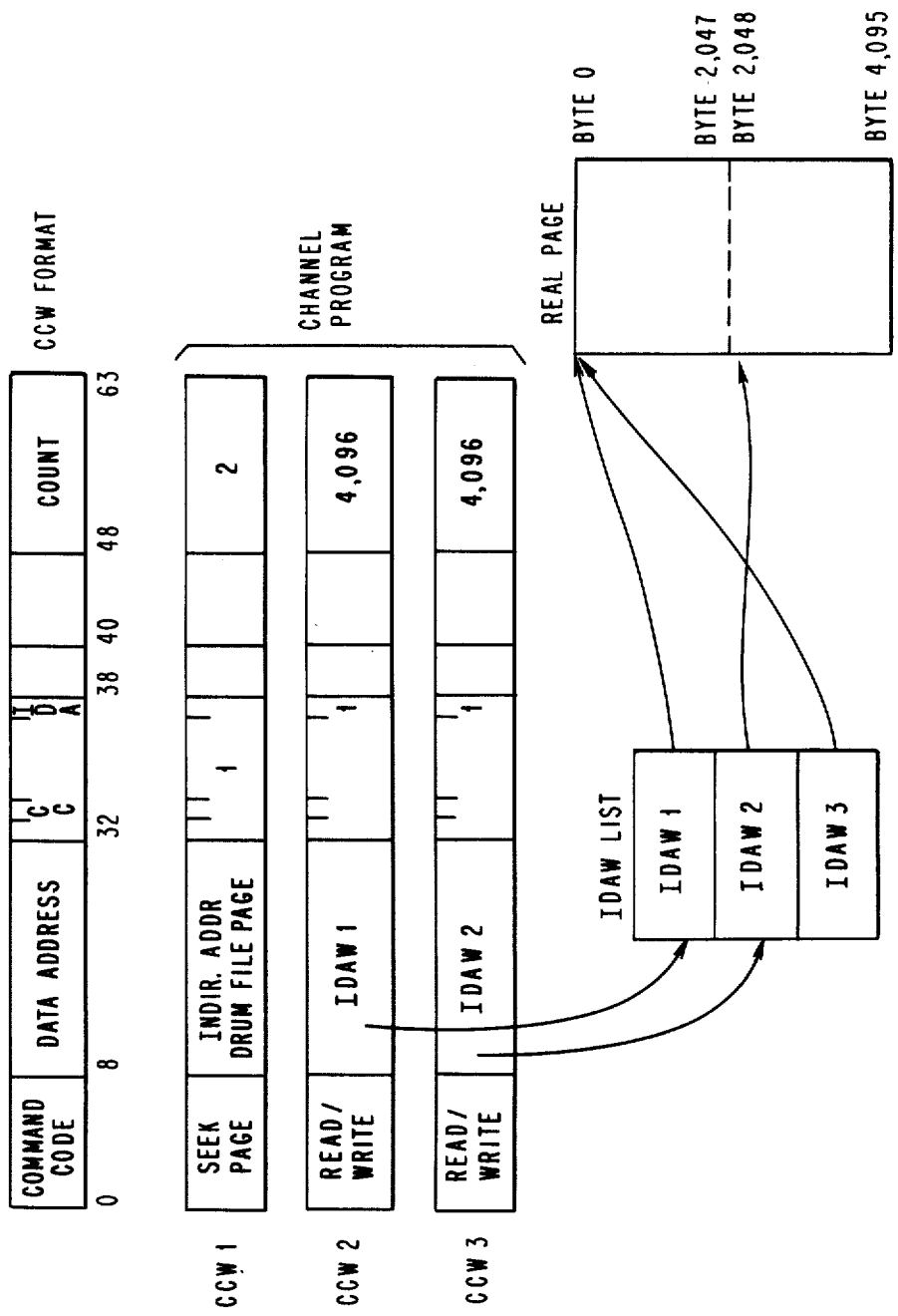
FIG. 3 shows a channel program structure used in the present invention.

FIG. 3 diagramatically shows the information format in a 3 CCW program set structured in accordance with the present invention. CCW 1 specifies a Seek Page operation in its command code field (bits 0-7), the address of a main storage location containing the address of a page on the bulk storage (drum file) in its data address field (bits 8-31), command chaining ("1" bit in flag bit position 33), and a count of 2 in the count field (bits 48-63). CCW 2 specifies a Read or Write operation in its command code field, location of a first indirect data address word 1 (IDAW 1) in its data address field, indirect data addressing ("1" bit at the indirect data address flag bit position 37), and a count of 4,096 in its count field. CCW 3 is identical to CCW 2 except that it specifies the location of a second IDAW, IDAW 2, in its data address field. The IDAW list in CPU main storage consists of 3 IDAWs, IDAWs 1, 2 and 3. IDAW 1 contains the main storage address of page Byte 0, i.e. the initial byte of the page; IDAW 2 contains the address of page Byte 2,048 (i.e. the initial byte of the second sector of the page), and IDAW 3 is identical to IDAW 1; that is, it contains the address of page Byte 0.

When channel indirect data addressing is specified as above ("1" in IDA flag bit 37 in the CCW) the data address in the CCW specifies the location of the first IDAW to be used for the data transfer defined by that command. As previously explained, each IDAW specifies the transfer source or destination in main storage of up to 2,048 bytes and additional IDAWs needed to complete the full page data transfer (4,096 bytes) are in successive locations in storage. As previously explained, each additional IDAW specifies the first byte of a 2,048-byte block, and may be prefetched by the channel during the execution of operations associated with the first IDAW.

In the preferred mode of operation of the present invention, a read or write operation relative to the "drum file" starts from the beginning of either Sector 0 (Byte 0) or Sector 1 (Byte 2,048) of the page specified by the Seek Page command, whichever is more immediately accessible for the operation. At a predetermined phase of the execution of CCW 1, i.e, the Seek Page operation, the control unit 50 examines a count value presented by counter means which will be described hereinafter in reference to FIG. 5. This value indicates the byte address that is currently accessible at the read/write port. Using this value the control bit determines which one of the Sectors 0 to 1 will be more immediately accessible for the data transfer taking into account the time required in the channel for command chaining and preparation of the expected read or write operation. If the determined sector is Sector 0, logic in the control unit is activated at the conclusion of the Seek Page operation to present Channel End (CE) and Device End (DE) signals to the channel. Upon recognizing the joint reception of CE and DE the channel prepares (i.e. chains to) CCW 2 which specifies IDAW 1. In turn IDAW 1 specifies the address of page Byte 0, i.e., the location in main storage of the starting byte of the page defined by the Seek Page command. Accordingly, the data transfer begins at the locations associated with Byte 0, in main storage and on the drum file, and continues through transfers between successive byte locations in both stores until Byte 2,047 is reached. At this point the channel recognizes by its conventional logic that a 2,048-byte block boundary has been reached and passes control of the data transfer to IDAW 2 which specifies the address of page Byte 2,048. The data transfer now continues through successive bytes until Byte 4,095 is reached. At that time, the remaining byte count, which when initially derived from CCW2 was 4,096 and has been decremented by one for each byte transfer, reaches zero. The channel thereby recognizes that the byte transfer phase of its operation relative to the control unit interface is complete. By means described later the control unit contemporaneously recognizes that a full page has been transferred over the interface. Accordingly, the transfer of bytes at the interface is halted.

On the other hand, if the control unit determines that the more immediately accessible sector is Sector 1, it terminates the Seek Page operation by signalling Channel End (CE), Device End (DE) and Status Modifier (SM) to the channel. This causes the channel to fetch and chain to the CCW whose main storage address is 16 higher (rather than 8 higher) than that of the current CCW. Consequently, the channel skips over CCW 2 and chains to CCW 3. CCW 3 specifies a 4,096 byte transfer and the location of IDAW2. IDAW 2 specifies the address of Byte 2,048 in the designated page data area in main storage. Accordingly the data transfer begins at the address associated with Byte 2,048 in the specified page area and continues through addresses associated with successive bytes of said page up to byte 4,095. At this point a 2,048-byte boundary is detected by the channel and control of the data transfer is passed to IDAW 3 which contains the main storage address of page Byte 0. Then the transfer proceeds with Byte 0 and successive bytes until Byte 2,047 has been transferred. At this point the remaining byte count, which was initialized at 4,096 by CCW 3 and decremented by one with each byte transfer, reaches zero indicating that a full page has been transferred over the interface between the channel and the control unit. Accordingly, this phase of the transfer operations is concluded.

At the completion of the data transfer phase, the control unit again makes a decision on the basis of the sector at which it started the operation. If the operation was started at Sector 0 (Byte 0)—i.e. if CCW 1 was chained to CCW 2—the control unit concludes the operation by sending the Status Modifier indication (SM) with the normal concluding indications of Channel End (CE) and Device End (DE). Accordingly, if the command chaining bit in CCW 2 is a 1 the channel adds 16 to its current command address, skips over CCW 3 and chains to a CCW contiguous in storage to CCW 3 (e.g. CCW 4). On the other hand if the operation was started at Sector 1 (Byte 2,048)—i.e. if CCW 1 was chained to CCW 3—the control unit concludes only with the normal CE and DE indications (i.e. without SM). Accordingly, if the command chaining bit in CCW 3 is a 1 and CCW 3 is followed in storage by CCW 4 the channel will chain directly to CCW 4. Consequently it will be appreciated that the foregoing selective concluding actions by the control unit permit the channel to chain between adjacently stored program sets of 3 CCW's associated with different page transfers, and thereby enable the channel to control multiple page transfers without having to be initiated by the CPU for each transfer. The ending status for the two types of operations just described is summarized below.

| Channel Program | | Concluding Signal for Starting in Sector | | Command Chaining Flag Bit |
|---|---|---|---|---|
| | | 0 | 1 | |
| 1. | CCW1 (Seek Page) | CE-DE | CE-DE-SM | 1* |
| | CCW2 (Read or Write) | CE-DE-SM | | 0/1** |
| | CCW3 (Read or Write) | | CE-DE | 0/1** |
| 2. | CCW4 (Seek Page) | CE-DE | CE-DE-SM | 1 |
| | CCW5 (Read or Write) | CE-DE-SM | | 0/1 |
| | CCW6 (Read or Write) | | CE-DE | 0/1 |
| | — | — | — | — |
| | — | — | — | — |

| Channel Program | Concluding Signal for Starting in Sector | | Command Chaining Flag Bit |
|---|---|---|---|
| | 0 | 1 | |
| — | — | — | — |

Note:
*Channel chains to CCW2 if operation is to start in Sector 0 or CCW3 if operation is to start in Sector 1.
**Channel simply concludes its operation if command chaining flag bit in CCW2 or CCW3 is 0, or channel chains to program 2 (CCW4) if command chaining flag bit in CCW2 or CCW3 is 1.

For the data transfer of channel program 1 starting in Sector 0, the Seek Page operation concludes with the status of CE-DE so that the channel chains to the immediately following CCW 2. The Read or Write operation associated with CCW 2 ends with the status of CE-DE-SM so that if CCW 2 calls for command chaining the next command CCW 3 is skipped over and the channel chains to the first CCW of channel program 2 (i.e. CCW 4). For the data transfer of channel program 1 starting in Sector 1, the Seek Page operation ends with the status of CE-DE-SM so that the channel skips over CCW 2 and chains to CCW 3. The Read or Write operation associated with CCW 3 ends with the status of CE-DE so that if CCW 3 specifies command chaining the channel chains to the immediately following command, CCW 4, of channel program 2.

Figure 4:
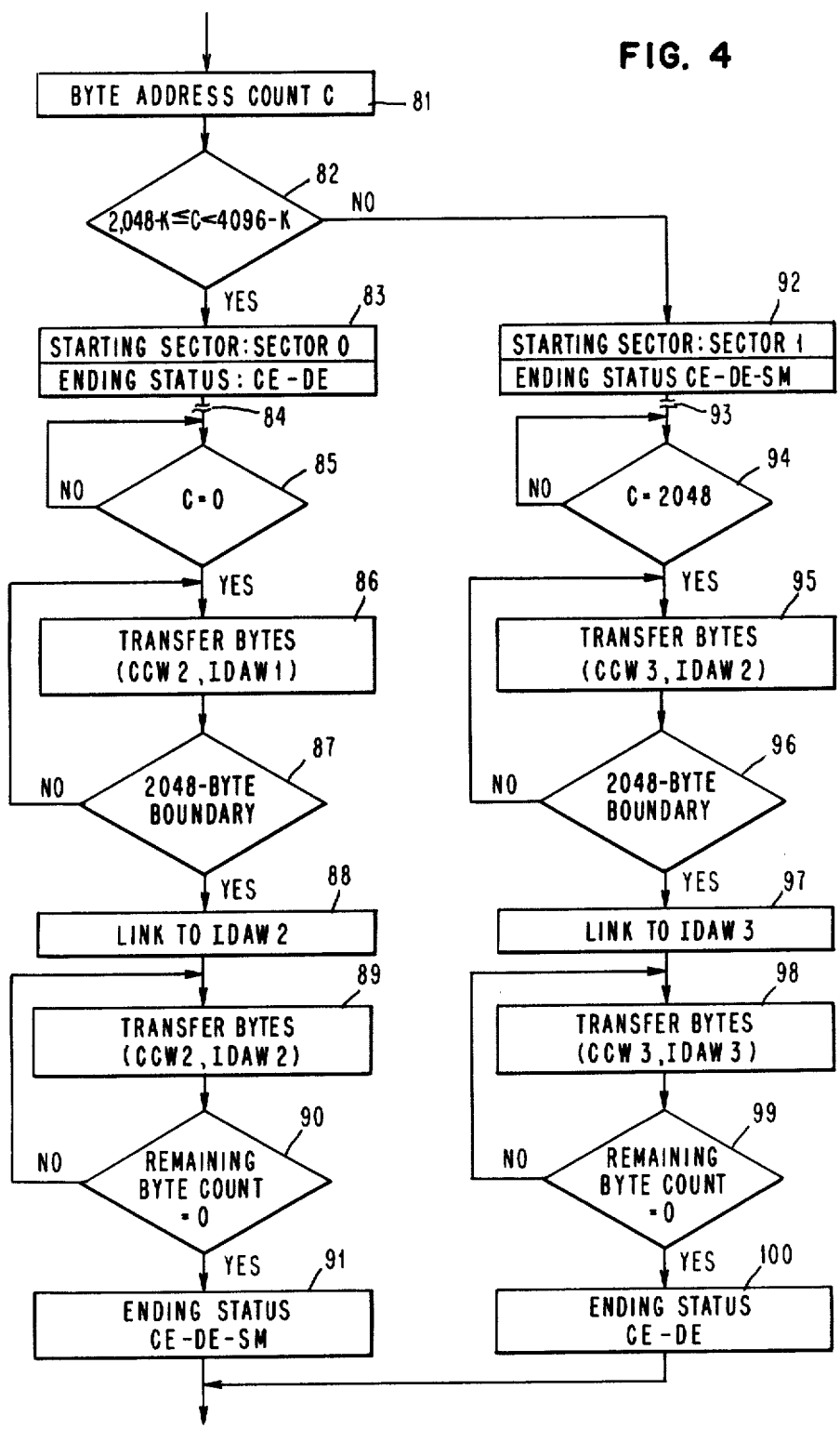
FIG. 4 shows a flow chart of logical operations performed in a control unit and a channel in accordance with the present invention.

FIG. 4 shows a flow chart of the operations performed by the channel and the control unit during Read or Write operations in accordance with the present invention. Operation 81 refers to a count maintained in the control unit of the byte address C which is currently accessible at the Read/Write ports 21–2N. In operation 82 control unit logic described hereinafter, acting at a predetermined time phase in the Seek Page operation, evaluates the current value of byte address C for sector selection. If this value is not less greater than 2,048-K but less than 4,096-K, Sector 0 is chosen, and if the value is not less than 4,096-K (modulo 4,096) but less than 2,048-K, Sector 1 is chosen; where K is a fixed number determined by the bit rate of the particular drum file and a (gap) time associated delay with the time required by the channel to prepare the chained (read or write) transfer operation. This gap time is needed because of the inherent delay involved in the preparation of the read or write CCW after the Seek Page operation is completed and the signalling to indicate the chained command function (read or write) to the control unit. If the byte address count C is not less than 2,048-K but less than 2,096-K, it is recognized that the starting sector is Sector 0 and the control unit generates ending status of CE-DE as suggested at 83. During the gap time suggested at 84 the control unit waits for a command signal from the channel indicating the transfer operation to be executed (read or write) and then enters the additional waiting loop formed at decision point 85. This loop terminates when the byte address count C reaches 0. Now the channel and control unit conduct the required byte transfer operation 86 under the control of CCW 2 and IDAW 1. The byte transfer continues until the channel detects a 2,048-byte boundary at 87, where it links to IDAW 2 via operation 88. Then the byte transfer operation continues at 89 under control of CCW 2 and IDAW 2. At decision point 90 the channel tests the remaining byte count, and when that count reaches 0 the channel halts the data transfer phase of the operation. Thereafter, the control unit concludes its part of the operation and generates ending status of CE-DE-SM at 91.

On the other hand, when a determination is made at decision point 82 that the byte address count C is not greater than 2,048-K (modulo 4,096) but less than 2,048-K, the control unit chooses Sector 1 as the starting sector and generates ending status of CE-DE-SM at 92. After waiting at 93 for a command signal from the channel the control unit idles in an additional waiting loop 94 which terminates when the byte address count C reaches 2,048. At this point, byte transfer operation 95 is started under the control of CCW 3 and IDAW 2. Byte transfer operation 95 continues until the channel detects a 2,048-byte boundary at 96 and links to IDAW 3 via operation 97. Thereafter the byte transfer operation continues at 98 under the control of CCW 3 and IDAW 3. At decision point 99 the channel determines when the remaining byte count reaches 0. When this occurs, the 4,096-byte data transfer is completed. The channel indicates this to the control unit which subsequently generates the ending status of CE-DE as suggested at 100.

Figure 5:
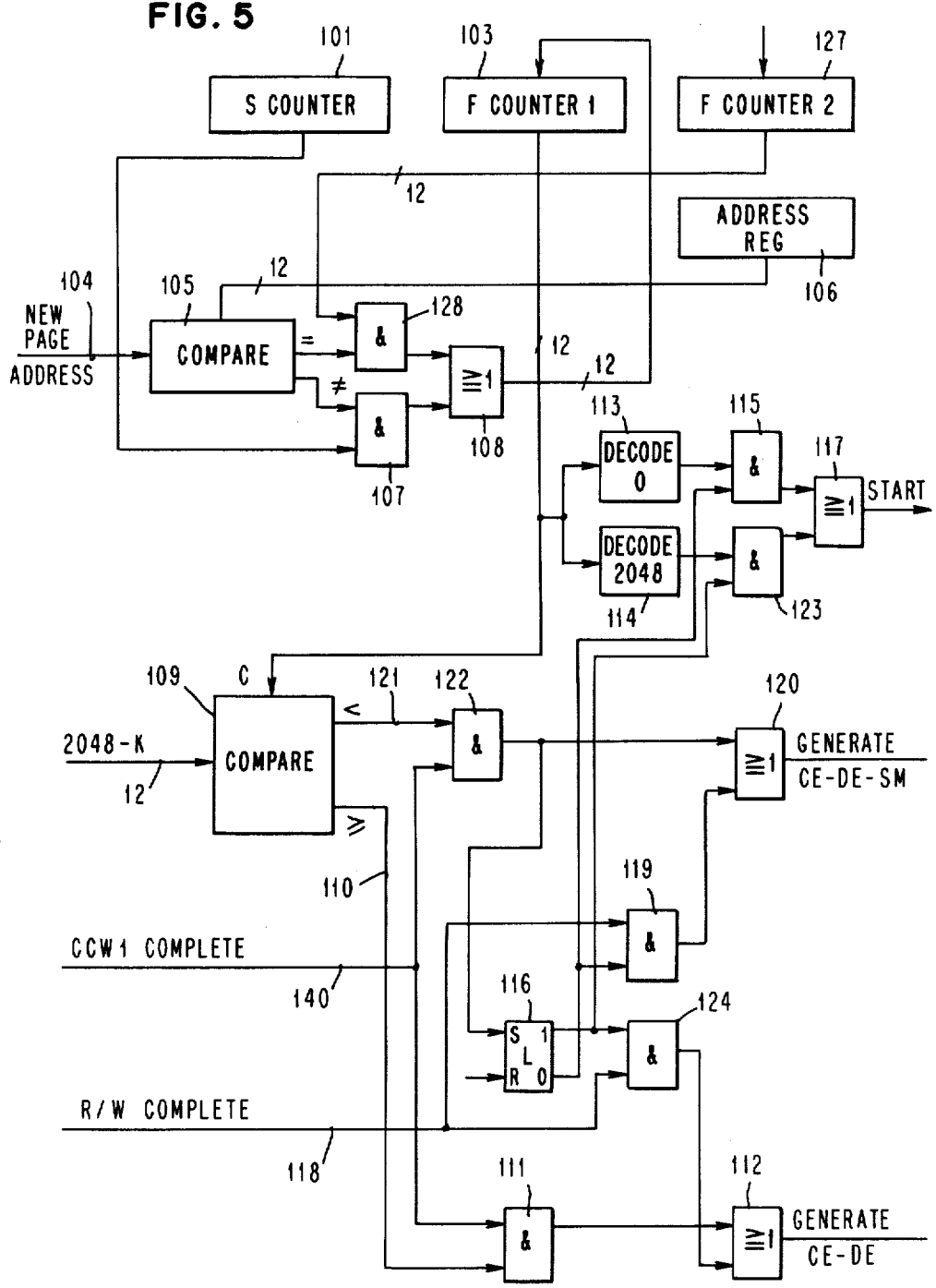
FIG. 5 shows a block diagram of logical circuitry for performing the logical operations shown in FIG. 4.

It will now be apparent to those skilled in the subject art that "conventional" I/O channels (herein meaning I/O channels of the type provided in IBM System/360 and System 370 computing systems) require no special adaptation for accomplishing the foregoing operations, other than the 3-command type of program described above. Although it is believed presently that it is novel to use varied sequencing of channel commands to support I/O operations in roll mode, nevertheless it should be understood that the ability to vary the sequence of selection of chained commands conditional on the status modifier function is a standard feature of IBM System/360 and System/370 channels (refer for instance to the above-referenced U.S. Pat. No. 3,400,371 to Amdahl et al at column 112 lines 27 to 42, and to the above-referenced Principles of Operation publication GA 22-7000 at page 215). Accordingly, it should be appreciated that only the control units associated with such conventional channels would require specific logical adaptation for sustaining the foregoing operations. FIG. 5 shows, in block diagram form, control unit logical circuitry for sustaining the operations shown in the flow chart of FIG. 4. The memory exemplified by the drum shown in FIG. 2 is preferably implemented in the status form of FIG. 1. Such arrays may be regenerated by a slow rate clock, e.g., at a 1 MHz rate, but data may be read out of such arrays or written into the arrays at a higher rate, e.g. 4 MHZ. A slow counter 101 and a fast counter 103 are provided to keep track of the address count during the slow rate mode and the fast rate mode, respectively. A 12-bit page address on bus lines 104 received from the channel is compared in compare circuit 105 with the content of an address register 106 which contains the address of a group of currently accessible pages. When these addresses are unequal, the content of the slow counter 101 is transferred to the fast counter 103 via an AND gate 107 and an OR gate 108. The content C of the fast counter 103 is compared at a compare circuit 109 with a count of 2,048-K, as explained previously in connection with step 82 of FIG. 4. If $C \geq 2,048-K$, line 110 is up so that upon completion of the seek operation defined by CCW 1 (line 140 up) an AND gate 111 is stimulated. This activates OR gate 112 to control the generation of CE-DE at the end of CCW1 (these actions correspond to steps 52 and 53 in FIG. 4).

The content C of the fast counter 103 is also supplied to decoders 113 and 114 which detect counts of 0 and 2,048, respectively in the output of the fast counter 103. When a count of 0 is detected by decoder 113 an AND gate 115 is activated because an associated latch 116 is not set at this time. Operation of AND gate 115 in turn activates OR gate 117 which issues the signal to start the data transfer (this corresponds to step 85 in FIG. 4). When 4,096 data bytes have been transferred, a R/W COMPLETE line 118 is elevated so that an associated AND gate 119 is operated. In turn this activates OR gate 120 to release a signal controlling the generation of CE-DE-SM at the end of read or write operation (these actions correspond to steps in FIG. 4).

On the other hand if compare circuit 109 determines $C \geq 2,048-K$ line 121 goes up so that upon the completion of the CCW 1 operation AND gate 122 will activates OR gate 120 to condition the generation of CE-DE-SM (corresponding to steps 81, 82 and 92 in FIG. 4). At the same time, the up signal from AND gate 122 sets the latch 116 thereby conditioning AND gate 123 so that upon detection of the count 2,048 by decoder 114 AND gate 123 is operated and this activates OR gate 117 to release the signal to start data transfer (corresponding to step 94 in FIG. 4). When the data transfer has been completed, the line 118 goes up causing operation of AND gate 124 because latch 116 is in set state. The up operation of the AND gate 124 activates OR gate 112 to release the signal controlling generation of the CE-DE (these actions correspond to steps 95-100 in FIG. 4).

As described above, normal regeneration may be accomplished at a slow rate, e.g. 1 MHZ rate, and when loops are to be read or written, the clocking to selected loops may be accelerated to the higher rate, e.g., 4 MHZ. This higher rate operation is called fast clocking mode. At the completion of a read or write operation with a selected loop, the loops which have been in the fast clocking mode are not in the same position as the other which have continued to be regenerated at the slow rate. Accordingly, the fast clocking mode must be continued until all loops are in alignment again. During this period of time the control and device operate in a "catch-up" mode. In this mode a second fast counter 127 tracks the fast cycling loop. At the completion of the fast clocking mode for each I/O data transfer operation, the content of the fast counter 103 is transferred to the second fast counter 127 via appropriate transfer gate means, not shown in FIG. 5. The second fast counter 127 keeps track of the loop position during the catch-up period, thereby freeing the first fast counter 103 and other circuits of FIG. 5 for another possible operation in respect to another loop.

During the catch-up period if a seek page request is received from a channel relative to a page associated with the loop currently being tracked by counter 127 an AND gate 128 is prepared and gate 107 is disabled. Accordingly, during this period counter 127 and gate 128 operate with compare circuit 105 performed in the page detection function previously described in reference to slow counter 101 and gate 107.

The end of the catch-up period is indicated when the value in counter 127 equals the value in slow counter 101, as determined by a not-shown comparator.

As discussed above, the latency reduction scheme of the present invention utilizes several capabilities of the existing standard channel, i.e, command chaining, status modifier and channel indirect data addressing. The only change additionally required in respect to such channels is the channel program must have the 3-CCW form described above. The control unit must be capable of keeping track of the currently accessible byte address within a 2-sector page, of determining the more immediately accessible one of the two sectors and of generating or not generating the status modifier with device end depending on which of the two sectors is selected.

When the present invention is used with a cyclic bulk storage having 4,096-byte pages, 4 MHZ clock rate and 4 MBPS data transfer rate, the performance gain resulting from the roll mode sector selection operates to reduce the worst case latency from 1,024 microseconds to 512 microseconds and the average latency from 512 microseconds to 256 microseconds. This improves the average page transfer time by 16 percent.

While the invention has been described with reference to a preferred embodiment thereof, it will be understood by those skilled in the art that the above and other changes may be made therein without departing from the spirit and scope of the invention.

Having thus described my invention, what I claim as new, and desire to secure by Letters Patent is:

1. In a data processing system including a central processing unit (CPU), a main storage, an input-output channel, a control unit and a page-organized cyclic access bulk storage device and means interconnecting in sequence said device, said control unit, said channel and said main storage for exchanging multi-byte page units of data, wherein said channel is adapted for operating under control of programs of chained commands located sequentially in said main storage to control selections of data pages and transfers of selected pages between said device and said main storage without interruption of said CPU, wherein said control unit is adapted for conditionally presenting status modifier signals to said channel in association with signals indicating conclusions of operations relative to said device, and wherein said channel is adapted to conditionally vary its sequence of chained command execution in response to said status modifier signals by modifying a command address used by said channel, said modifying of said address having the effect of causing said channel to skip over the command which otherwise would be next selected for execution, the improvement for effecting reduced latency access to said device comprising:

means in said channel for fetching a first command in a program of three commands stored in successive address location in said main storage and means in said control unit for locating a page storage area in said device according to said first command, means in said control unit associated with said page storage area locating means for distinguishing an initial byte location in a first or a second half-page sector of said page area as an optimum starting position for a transfer of a page of data between said page storage area in said device and a page storage area in said main storage, means in said control unit associated with said sector distinguishing means for presenting either a first or a second combination of concluding signals to said channel depending respectively on whether said distinguishing means has distinguished a byte location in said first or said second half-page sector area of said device as an optimum starting position; one of said first and second combinations including a said status modifier signal and the other of said combinations not including a said status modifier signal; and means in said channel responsive to said first or second combination of concluding signals for respectively causing said channel to chain to the second or third command in said program; said second and third commands both specifying page data transfer operations; said second command being located in main storage immediately following said second command; said second command effectively specifying a page transfer operation relative to a page storage area in said main storage having first and second successively located half-page sectors, said transfer operation being effectively defined to start at an initial byte address location within said first half-page sector and proceed progressively through all byte locations in said first and second sectors; said third command effectively specifying the same page storage area and page transfer operation as said second command, but with the transfer effectively defined to start at an initial byte address within the second half-page sector, progress through all byte locations in said second sector, then link to the initial byte location in the first sector, and then progress through all byte locations in the first sector.

2. The improvement for effecting reduced latency access according to claim 1 further comprising:

means in said control unit associated with said sector distinguishing means for presenting at conclusion of a one-page data transfer, either a third or a fourth combination of concluding signals to said channel depending respectively on whether said distinguishing means has distinguished a byte location in said first or said second half-page sector area of said device as an optimum starting position; said third combination including a said status modifier signal and said fourth combination not including a said status modifier signal, and means in said channel responsive to said third or fourth combination of concluding signals for respectively causing said channel to chain to a first command in a second program of three commands located contiguous to said first-mentioned program in said main storage.

3. The improvement for effecting reduced latency access according to claim 1 wherein:

said means for distinguishing the initial byte location includes counter means for keeping track of the currently accessible byte address in said device, and logic means associated with said counter means for determining which of said first and second half-page sectors represents said optimum starting position.

4. The improvement for effecting reduced latency access according to claim 3 wherein:

said logic means effectively uses the said value of the currently accessible byte address diminished by a constant quantity to determine said optimum position, said constant quantity being determined as a function of the bit circulation rate of said device and a delay factor associated with the time required by said channel to prepare for an operation by command chaining.

5. The improvement for effecting reduced latency access according to claim 1 wherein:

said cyclic bulk storage device is a CCD storage device.

6. The improvement for effecting reduced latency access according to claim 1 wherein:
said cyclic bulk storage device is a magnetic bubble storage device.

7. In a data processing system including a central processing unit (CPU), a random access main storage, an input-output channel and a bulk memory subsystem including a cyclic bulk storage device and a control unit, means connecting in sequence for data transfers said main storage, said channel, said control unit and said device,
- said channel being adapted to operate under control of a channel program consisting of a plurality of channel command words (CCWs) arranged in sequential storage locations, and to vary its sequence of execution of such commands in response to reception from said subsystem of a Status Modifier (SM) signal in association with a Device End (DE) signal,
- said SM signal being generated by said susbsystem when the sequence of execution of said commands has to be changed, said DE signal being generated by said subsystem when an operation designated by a current CCW has been completed,
- said cyclic bulk storage device being partitioned into a plurality of pages accessible on a random basis, each page each having a predetermined number of parallel cyclic tracks each having a predetermined number of memory elements thereon, each of said pages being further divided into two sequentially and cyclically accessible sectors, the first sector being a leading sector and the second sector being a trailer sector,
- each of said pages having associated therewith a read/write port for allowing serial read/write access to bit-parallel bytes composed of bits arrayed on said predetermined number of parallel tracks, such that a complete page of data can be transferred between a selected page location in said cyclic bulk storage device and a specified one-page data area in said main storage, byte by byte,
- said channel further being adapted to operate in a channel indirect data addressing mode wherein a data address in the CCW is used to locate a list of indirect data address words (IDAWs) each containing a real address designating a data area in said main storage;

a method of providing reduced latency access to said device comprising:
- storing a first channel program in said main storage consisting of three sequentially located CCWs and three sequentially located IDAWs, the first CCW being a Seek Page command specifying a page location in said cyclic bulk storage device to be read or written and having a command chaining bit indicating that the operation has to be chained to a next following CCW, the second CCW being a Read/Write command specifying the location of the first of said three IDAWs and specifying a transfer of one page of data between the page location in said cyclic bulk storage device specified by said first CCW and a one-page data area in said main storage specified in part by said first IDAW and in part by the second of said three IDAWs, said third CCW being a Read/Write command specifying the location of said second IDAW and specifying a transfer of one page of data between the page location in said cyclic bulk storage device specified by said first CCW and a one-page data area in said main storage specified in part by said second IDAW and in part by the third of said three IDAWs, said one page data area being the same as the one page data area specified by said first and second IDAWs,
- said first IDAW specifying the read address of the first byte location in a first half of said one-page data area in said main storage, said second IDAW specifying the real address of the first byte location in a second half of said one-page data area, and said third IDAW specifying the same read address as said first IDAW, each of said IDAWs being associated with the transfer of a half page of data and being capable thereby of controlling the transfer of a half-page of data, byte by byte, relative to said cyclic bulk storage device,
- determining in said subsystem at the end of the operation controlled by said Seek Page command, whethere said first or second sector of the specified page of said cyclic bulk storage device will be more immediately accessible, when said channel will have prepared for a read/write operation associated with either said second or third CCW;
- transmitting said DE signal either alone or in association with a said SM signal in accordance with the results of said sector determining step,
- chaining from said first CCW to said second CCW when said first sector is signalled to be more accessible and thereby directing the associated transfer by said first and second IDAWs in sequence and thereby causing the page transfer to begin in said first sector and to progress sequentially through bytes in said first sector and then through second sector and chaining from said first CCW to said third CCW when said second sector is signalled to be more accessible and thereby causing the associated transfer to be directed by said second and third IDAWs in sequence and thereby causing the data transfer to begin in said second sector, progress through all bytes in said second sector and then proceed through the bytes in said first sector.

8. The latency reduction method according to claim 7 including:
- storing a second channel program similar to said first program contiguous to said first program in said main storage; and
- causing said channel to proceed from said first channel program to said second channel program by locating command chaining bits in said second and third CCWs and by selectively transmitting said SM signal to said channel at the end of the transfer of one page to cause said channel to branch from said second CCW or to proceed directly from said third CCW to a first CCW in said second program, whereby two pages of data are transferred between said device and main storage.

9. The latency reduction method according to claim 7 wherein said cyclic bulk storage device is an electronic drum file having multiple parallel shift register loops containing said pages including:
conducting said page transfer operations relative to selected said loops.

10. A latency reduction scheme according to claim 9 wherein said shift register loops are composed of CCD registers.

11. A latency reduction scheme according to claim 9 wherein said shift register loops are formed of magnetic bubble registers.

12. A latency reduction scheme according to claim 7 including:
keeping track in said control unit of the currently accessible byte address in said device, and
determining, based on said address and a known factor of channel operation timing which of said first and or second sectors is more immediately accessible.

13. A latency reduction scheme according to claim 12 including:
using the algebraic sum of said currently accessible byte address and a constant factor to determine the more immediately accessible sector, said constant being associated with the bit rate of said device and said known factor of channel operation timing, said known factor being related to the time required by said channel to prepare for linking one command operation to another by command chaining.

14. In a data processing system including a central processing unit (CPU), a main storage, an input-output channel, a control unit and a page-organized cyclic access bulk storage device and means interconnecting in sequence said device, said control unit, said channel, and said main storage for exchanging multi-byte page units of data, a method for operating the cyclic bulk storage device, the channel and the control unit comprising:
storing programs of chained commands sequentially in said main storage, said programs being adapted to control selections of data pages and transfers of selected pages between said device and said main storage without interruption of said CPU,
fetching by said channel a page locating command in a first page-transfer program of said chained commands to said channel and operating in said control unit in response to said page locating command to locate a page storage area in said device,
determining, by operations in said control unit at the conclusion of the operation defined by said page locating command, whether an initial byte location in a first or a second half-page sector of the located page area in said device is an optimum starting position for efficiently initiating a byte sequential transfer of a page of data between said page storage area in said device and a page storage area in said main storage taking into consideration the time required by said channel to prepare for command chained operation,
presenting either a first or a second combination of concluding signals from said control unit to said channel depending respectively on whether said first or said second half-page sector of said device has been determined as an optimum starting position, one of said first and second combinations including a status modifier signal and the other of said combinations not including a said status modifier signal, said status modifier signal being effective to cause said channel to vary its sequence of command execution by modifying a command address used by said channel with the effect of inducing said channel to skip over the command which otherwise would be next selected for execution, and
chaining said channel to either a second or a third command in said first program, said second and third commands each specifying a page data transfer operation; selecting said second or third command depending respectively on whether said first or said second combination of concluding signals has been presented to said channel; said second command being located in main storage at an address location immediately following said page locating command, and said third command being located in main storage at an address location immediately following said second command; said second command effectively specifying a page storage area in said main storage, a page transfer operation relative to said area and an initial byte address within a first half-page sector in said area as an initial location for conducting the transfer of an initial byte of said page; said third command effectively specifying the same page storage area and page transfer operation as said second command but with an initial byte location in a second half sector of said main storage page storage area as an initial byte transfer location.

15. A method for operating a cyclic bulk storage device, channel and control unit according to claim 14 further comprising, after the execution of a one-page data transfer in a selective sequence in accordance with said second or third command:
at conclusion of said one-page data transfer, presenting from said control unit to said channel either a third or a fourth combination of concluding signals depending respectively on whether a byte location in said first or said second half-page sector area of said device has been determined as an optimum starting position; said third combination including a said status modifier signal and said fourth combination not including a said status modifier signal; thereby enabling said channel to chain to a first command in a second page-transfer program located contiguous to the third command in said first program.

16. In a data processing system comprising a central processing unit (CPU), a main storage, a channel and bulk memory subsystem including a cyclic bulk storage device and a control unit,
means connecting in sequence said main storage, said channel, said control unit and said device for exchanging data and control information with said CPU and said main storage through said channel, said subsystem presenting device end (DE) control signals to said channel at the conclusion of each exchange operation either with or without a status modifier (SM) control signal;
said channel being adapted to operate under control of a channel program consisting of a plurality of chained channel command words (CCWs) arranged in consecutive storage locations, and to vary its sequence of command execution in said programs in response to reception or non-reception of said SM signal in association with said DE signal,
said SM signal being generated by said subsystem when a command must be retrieved from a non-consecutive location, said DE signal being generated by said subsystem when an operation designated by a currently effective CCW has been completed,
said cyclic bulk storage device partitioned into a plurality of pages accessible on a random access basis, each page having bits located in a predetermined number of parallel cyclic tracks, each track having a predetermined number of bits thereon, each of said pages being further divided into two sequentially and cyclically accessible sectors, the first sector being a leading sector and the second sector being a trailing sector, each of said pages having associated therewith a read/write port for allowing parallel read/write access to bits on said predetermined number of parallel tracks consituting a byte, such that a complete page of data can be transferred between a selected page of said cyclic bulk storage device and a specified one-page data area of said main storage on a byte serial bit parallel basis, said channel further being adapted to operate in a channel indirect data addressing (CIDA) mode wherein a data address in a CCW specifying a page data transfer refers to a list of indirect data addressing words (IDAWs) each defining a half-page storage area in said main storage;

a method for operating the cyclic bulk memory subsystem and the channel comprising:

storing in said main storage a first page-transfer channel program consisting of three consecutively located CCWs and three consecutively located IDAWs, the first of said three CCWs being a Seek Page command for specifying a page location in said cyclic bulk storage device to be read or written and having a command chaining bit indicating that the operation has to be chained to another CCW in said first program, the second CCW being a Read/Write command defining a transfer of one page of data between the page location specified by said first CCW and a one-page data storage area in said main storage specified by the first two of said three IDAWs, said second CCW specifying the address of said first IDAW, said first IDAW defining a first half-page sector and said one-page storage area, said first IDAW being serially associated with said second IDAW, said second IDAW specifying the remainder of said one-page area, said third CCW being a Read/Write command defining a transfer of one page of data between the page location specified by said first CCW and the one-page data storage area specified by said second and third IDAWs, said third CCW specifying said second IDAW, said second IDAW being serially associated with said third IDAW, said third IDAW being identical to said first IDAW, fetching and executing said first CCW by said channel to control said device to locate said page location in said cyclic bulk storage device to be read or written, at the end of the operation defined by said first CCW determining whether the first or second sector of the specified page of said cyclic bulk storage device is more immediately accessible taking into account the time required by said channel to prepare for command chaining;

issuing said DE signal selectively with or without said SM signal in accordance with result of said determining step, fetching said second or third CCW by said channel depending respectively on whether said DE signal issued with or without said SM signal, executing by said channel the fetched one of said second and third CCWs to control said device to perform the associated one-page data transfer, respectively beginning said transfer either in the first or second half of the specified page location in said cyclic bulk storage device and in the first or second half sector in the one-page data, and respectively concluding said transfer either in the second area of said main storage or first half of the specified page location in said device and in the second or first half-sector of said page storage area.

17. A method for operating the cyclic bulk memory subsystem and the channel according to claim 16, further comprising:

storing in said main storage a second page-transfer channel program contiguous to said first program, said second program comprising three CCWs and three IDAWs, concluding the Read/Write operation specified by the second or third CCW of said first program either without or with the transfer of the SM signal by said subsystem to said channel in association with the DE signal, depending respectively on whether said first or second half of said page was accessed first, and chaining by said channel the end of said first program to the first CCW of said second program in response to said signals transferred in said concluding step.

* * * * *